(12) United States Patent
Hao et al.

(10) Patent No.: US 7,643,029 B2
(45) Date of Patent: Jan. 5, 2010

(54) METHOD AND SYSTEM FOR AUTOMATED VISUAL COMPARISON BASED ON USER DRILLDOWN SEQUENCES

(75) Inventors: Ming C. Hao, Palo Alto, CA (US);
Umeshwar Dayal, Saratoga, CA (US);
Peter J. Wright, Kennesaw, GA (US);
Jerry Shan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1338 days.

(21) Appl. No.: 10/774,315

(22) Filed: Feb. 6, 2004

(65) Prior Publication Data
US 2005/0177598 A1   Aug. 11, 2005

(51) Int. Cl.
*G06T 11/20* (2006.01)
*G06K 15/00* (2006.01)

(52) U.S. Cl. .................... 345/440; 358/1.18; 358/2.1; 358/1.9; 358/403; 358/462; 358/530; 358/537; 707/7; 707/200; 345/440.2

(58) Field of Classification Search ............. 345/440, 345/440.2; 358/1.18, 2.1, 1.9, 403, 462, 358/530, 537, 443; 707/7, 200
See application file for complete search history.

(56) References Cited

U.S. PATENT DOCUMENTS 5,801,688 A * 9/1998 Mead et al. .............. 715/700
5,893,090 A * 4/1999 Friedman et al. .......... 707/3
5,929,863 A * 7/1999 Tabei et al. ............... 345/440
6,400,366 B1 * 6/2002 Davies et al. ............. 345/440
2002/0174087 A1   11/2002 Hao
2003/0071815 A1   4/2003 Hao

OTHER PUBLICATIONS

D. Keim, M. C. Hao, J. Ladisch, M. Hsu, U. Dayal, "Pixel Bar Charts: A New Technique for Visualizing Large Multi-Attribute Data Sets without Aggregation", HP Technical Report, Apr. 11, 2001, pp. 1-10.*
M. Ankerst, M. Ester, H.-P. Kriegel, "Towards an effective cooperation of the computer and the user for classification", Proc. 6th Int. Conf. On Knowledge Discovery and Data Mining, (KDD '2000), Aug. 20-23, 2000, Boston, MA, 2000, pp. 1-10.*
M.C. Hao, J. Ladisch, U. Dayal, M. Hsu, A. Krug; "Visual Mining of E-customer Behavior Using Pixel Bar Charts", HP Technical Report, Jun. 20, 2001, pp. 1-7.*
B. Shneiderman, "Tree Visualization with Treemaps: a 2-D Space-Filling Approach", ACM Transactions on Graphics, vol. 11, No. 1, pp. 92-99.*
D. Keim, M.C. Hao; U. Dayal; "Hierarchical pixel bar charts", IEEE Trans. On Visualization and Computer Graphics, vol. 8, No. 3, Jul.-Sep. 2002, pp. 255-269.*

(Continued)

*Primary Examiner*—Jin-Cheng Wang

(57) ABSTRACT

A method for presenting data comprises receiving the data; and deriving a multi-level dynamic hierarchical structure for the data based on drilldown sequences input from a user, wherein the drilldown sequences automatically compute a graphical visual comparison of the data and comprise: deriving a multi-pixel bar chart to display an aggregated data paradigm; and deriving a graphical illustration to display a data distribution paradigm.

20 Claims, 4 Drawing Sheets

OTHER PUBLICATIONS

Ming Hao, U.S. Appl. No. 09/609,101, filed Jun. 30, 2000, Method and Apparatus for Visual Mining of Multiple Simultaneous Presentations by Plugging in a Plurality of Existing Graphic Toolkit.

Ming Hao, U.S. Appl. No. 10/694,076, filed Oct. 27, 2003, Visual Boundaries for Aggregate Information in Pixel-Oriented Graphs.

Ming Hao, U.S. Appl. No. 10/941,114, filed Sep. 15, 2004, Constructing Substantially Equal-Width Pixel Bar Charts to Enable Visual Data Analysis.

Daniel Keim, Pixel Bar Charts: A New Technique for Visualizing Multi-Attribute Data Sets Without Aggregation, IEEE/InfoVis2001.

Ming Hao, VisImpact: Business Impact Visualization, HP Technical Report, Jun. 2003.

Ming Hao, Visual Mining of E-Customer Behavior Using Pixel Bar Charts, HP Technical Report, Oct. 15, 2004.

Daniel Keim, Designing Pixel-Oriented Visualization Techniques: Theory and Applications, IEEE Transactions on Visualization and Computer Graphics, vol. 6, No. 1, Jan.-Mar. 20.

Daniel Keim, PixelMaps: A New Visual Data Mining Approach for Analyzing Large Spatial Data Sets, ICDM 2003, 3rd IEEE International Conference on Data Mining, Melbourne, FL.

Daniel Keim, Visual Techniques for Exploring Databases, Invited Tutorial, Int. Conference on Knowledge Discovery in Databases (KDD'97), Newport Beach, CA, 1997.

* cited by examiner

METHOD AND SYSTEM FOR AUTOMATED VISUAL COMPARISON BASED ON USER DRILLDOWN SEQUENCES

BACKGROUND

Business data is a source of valuable information and can provide a competitive advantage if the data can be quickly and accurately analyzed. Finding valuable information hidden in large amounts of data, though, can be quite challenging. Business service researches, for example, need to compare daily market changes and sales growth rates. This information, however, can be concealed in vast amounts of data. Visual data comparison techniques can be extremely useful for revealing such valuable information hidden in data.

Visual data comparison techniques include simple graphical techniques, such as bar charts, pie charts, and x-y charts. These simple graphical techniques are easy to use but offer limited information, especially for visually evaluating large amounts of business data. For example, simple bar charts or pie charts show highly aggregated data while simultaneously omitting many other data values, such as data distribution of multiple attributes, patterns in data, correlations, or other detailed information.

SUMMARY

In one embodiment, a method for presenting data comprises receiving the data; and deriving a multi-level dynamic hierarchical structure for the data based on drilldown sequences input from a user, wherein the drilldown sequences automatically compute a graphical visual comparison of the data and comprise: deriving a multi-pixel bar chart to display an aggregated data paradigm; and deriving a graphical illustration to display a data distribution paradigm.

Other embodiments and variations of these embodiments are shown and taught in the accompanying drawings and detailed description.

DETAILED DESCRIPTION

In an exemplary embodiment, the present invention is directed to visual data comparison techniques for quickly and easily comparing, analyzing, and/or revealing information in large amounts of data. The invention, for example, can be utilized to visualize valuable information concealed in vast amounts of data, such as business data. As one example, differences, changes, or trends in large amounts of data can be distilled to be quickly and easily visually apparent.

Figure 1:
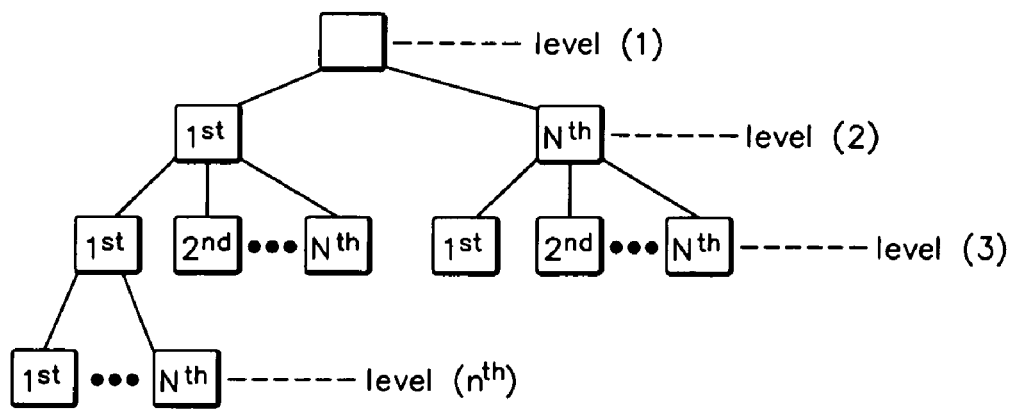
FIG. 1 is a multi-level hierarchy structure according to an exemplary embodiment of the invention.

FIG. 1 illustrates one exemplary embodiment as a multi-level hierarchical structure. This structure, for example, may be embodied in various systems, methods, and/or apparatus. The structure provides a visual comparison of data using a multi-level hierarchical tree to automatically compute and compare changes over time of data. The changes can be visually revealed in various paradigms. The changes, for example, can be revealed in two paradigms: changes in aggregated data (such as total values), and changes in how data is distributed. These changes, and corresponding comparisons, can be revealed with different visualization techniques or visual data comparison techniques and still be within the scope of the invention. Further, embodiments within the invention are applicable to various types of data and are not limited to, for example, business data.

The hierarchical structure of FIG. 1 includes a plurality of different levels. These levels can vary in type, number, or degree, just to name a few examples. FIG. 1, for example, shows numerous different levels, shown as level (1), level (2), level (3), and continuing to an $n^{th}$ level, level ($n^{th}$).

In one exemplary embodiment, the hierarchical structure of FIG. 1 utilizes user drilldown event sequences to provide a dynamic hierarchical tree structure that automatically performs comparisons with data at a previous level. These comparisons are visually displayed to the user in the form of, for example, graphical illustrations. The visual comparisons are automatically constructed or generated based on user input information or specified user drilldown sequences, choices, or selections. For example, if the user commences at level (2) and drillsdown to the first block in level (3), then a first visual comparison is automatically generated and presented to the user. If, on the other hand for example, the user commences at level (2) and drillsdown to the second block in level (3), then a second visual comparison is automatically generated and presented to the user. The second visual comparison would be different than the first visual comparison since the drilldown sequences between the two examples are different.

Embodiments in accordance with the present invention comprise a dynamic hierarchical tree structure. As used herein, the term "dynamic" means characterized by or having the ability to change or alter. Thus, the configuration, structure, or sequence of hierarchical tree can change depending on user selections or drilldown sequences made by the user. FIG. 1 shows that the hierarchical tree can have a multitude of levels and a multitude of components (shown as blocks $1^{st}$, $2^{nd}$, ... $N^{th}$) in each level. The configuration, structure, or sequence of the hierarchical tree, thus, changes or alters depending on the drilldown choices made by the user.

The term "drilldown" or "drill down" (or variations thereof) is used when referring to moving down through a hierarchy of folders and/or files in a file system like that of Windows. The term may also mean clicking, selecting, and/or navigating through a series of dropdown menus or graphical illustrations in a graphical user interface. Drilldown layers, for example, allow the user to explore the graphical illustration in a hierarchical manner by pointing, clicking, and/or selecting on the part of the graphical illustration where more detail is needed but illustrate an exemplary embodiment for discussion.

The hierarchical structure in accordance with the present invention can be utilized in various environments and with various functions or purposes. In one embodiment, for example, the structure is used to provide a visual comparison of current data values (such as ranking average, standard deviation, and data distribution) within average group values of a previous or adjacent upper level in the multi-level hierarchical structure. Looking to FIG. 1, for example, if a user drillsdown from level (2) to level (3), then a comparison of data between level (3) and level (2) can be automatically computed and then presented to the user in the form of a graphical illustration. In other words, as the user drillsdown from a first level to a second level in the hierarchical tree, comparisons of data between the first and second levels are automatically performed or computed and then these comparisons are visually presented to the user. Preferably, such comparisons are computed in real-time for presentation to the user via, for example, a graphical user interface.

Various paradigms or models can be utilized in embodiments in accordance with the present invention to provide visual comparisons of the data between adjacent levels in the hierarchical tree. The visual comparison, for example, can be revealed in the utilization of both aggregated data and data distribution. Aggregated data provides information that can be quickly and easily analyzed. Data distribution provides much more detailed information, such as on ratios, proportional information, and exceptional data.

FIGS. 2-8 illustrate exemplary embodiments in accordance with the present invention and provide examples of the features discussed in connection with FIG. 1. FIGS. 2-8, however, are intended to be illustrative in nature. As such, specific numerical data values (such as specific quantities, dollar amounts, etc.), data categories (such as specific calendar periods, product types, regions, etc.) or other specific information should be interpreted as illustrative for discussing exemplary embodiments. Such specific information is not provided to limit the invention.

FIGS. 2-8 represent visual data comparison techniques for a hypothetical company. For illustration, large amounts of business type data are assumed to exist. This data may be gathered and/or compiled over a period of time for a variety of different products in a variety of different regions. In the scenario, data is gathered over a one year period, shown at level (1) as "Year-1" in FIG. 2. Level (2) illustrates that this data is divided into monthly increments, January through December for the given year. As shown in level (3), each month can be further divided into respective days occurring in the month. January, for example, is divided into 31 days to represent January $1^{st}$ through January $31^{st}$. Each day is further divided into respective regions, shown as Region-1 through Region-N in level (4). These regions, for example, could represent cities, states, countries, or other geographical boundaries. In turn, a plurality of products, shown as Products-1 through Products-N, is provided for each respective region. Of course, the hierarchical structure of FIG. 2 does not need to be limited to any particular time frame, geographical boundary, or product.

Figure 2:
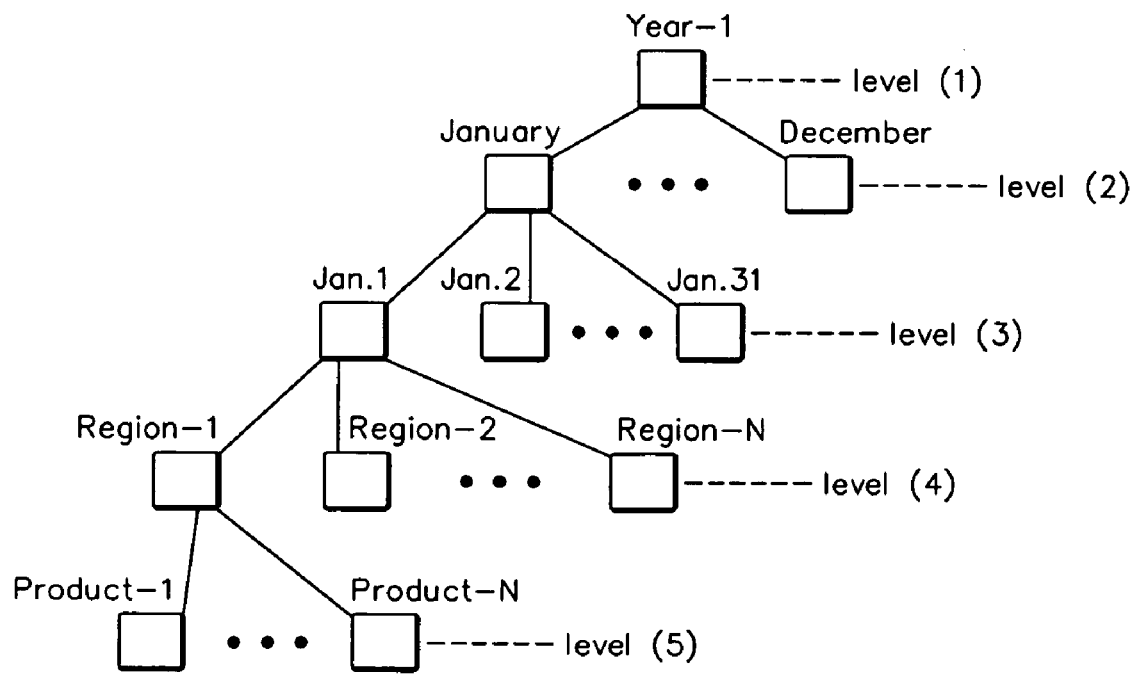
FIG. 2 is an exemplary multi-level hierarchy structure of FIG. 1.
Figure 3:
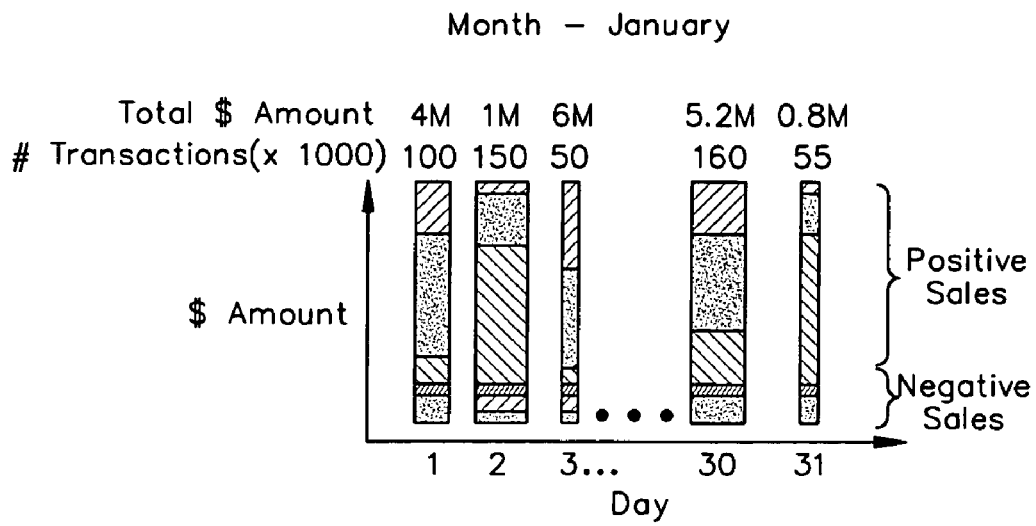
FIG. 3 is a drilldown illustration of hierarchy level (2) of FIG. 2.

FIG. 3 is a drilldown illustration of hierarchy level (2) of FIG. 2. For illustration purposes, assume that a user starts at "Year-1" in level (1) and then drillsdown to the month of January in level (2). As the user performs this drilldown sequence, the graphical illustration in FIG. 3 is automatically generated or computed and then visually displayed to the user, for example, on a display of a computer or other electronic device. For illustration purposes, the month of January in FIG. 3 is shown as a pixel bar chart. The illustration includes an X-axis that represents the 31 different days in the month of January. The Y-axis represents a dollar amount ($ Amount). A bar exists for each day of the month. Two numbers appear above each bar. A first number represents a number of events or transactions (# Transactions) that occurred for the specific day in the month of January. A second number represents a total dollar amount (Total $ Amount) corresponding to the money or dollar amount for the respective number of transactions. For example, the number of transactions could represent the number of sales of product and/or services or contracts that occurred on a specific day. Further, the total dollar amount could represent the amount of sales corresponding to the specified number of transactions. As shown for illustration purposes, January $1^{st}$ had 100 transactions with a total dollar amount of 4 million dollars. Of course, the dollar amounts could be given in any denomination, and number of transactions or dollar amounts could be given with various multiplies (such as 10, 100, 1000, etc.).

In FIG. 3, the bars each have an equal height. The width, though, corresponds to a number of transactions that occur for the specific day. For example, since January $2^{nd}$ has 150 transactions and January $3^{rd}$ has 50 transactions, the width of the bar of January $2^{nd}$ is three times the width of the bar of January $3^{rd}$.

Figure 4:
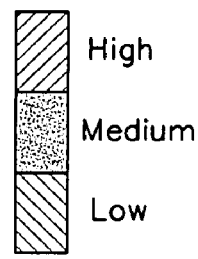
FIG. 4 is an exemplary bar key for use in FIGS. 3, 5, 7, and 8.

In an exemplary embodiment, each bar of FIGS. 3, 5, 7, and 8 is a pixel type bar. The pixel bars represent additional information with variations in, for example, color or graphical or textual distinctions. FIG. 4 illustrates an exemplary bar key for use in FIGS. 3, 5, 7, and 8. As shown in FIG. 4, each bar can illustrate three different levels or types of information corresponding to high, medium, and low. Of course, a greater or lesser number of levels could be utilized. For example, a variety of different colors could be used to distinguish between numerous levels within each bar.

Looking to FIG. 3, the Y-axis is further divided into "positive sales" and "negative sales." A positive sale, as understood in the art, can represent positive income through a contract or sale, for example. By contrast, a negative sale could represent a returned product or a recanted sale or contract, for example. A dividing thick line in each bar distinguishes or divides the positive and negative sales. This line, for example, could be colored to visually separate the positive and negative sales.

FIG. 3 illustrates in a single chart (here a pixel bar chart) an example of using visual comparison to analyze aggregated data (here number of transactions and total dollar amount). Each specific transaction (such as a single sale or contract) is represented by a single pixel in each bar. In the chart, the X-axis represents a day, and the Y-axis represents a value of dollar amount. Of course, representations in the X and Y axes could be switched or altered and still be within the scope of embodiments in accordance with the invention.

In FIG. 3, each pixel can be arranged in a variety of ways. For example, pixels can be arranged from bottom to top and left to right in each bar. The dollar amount ($ Amount) can be encoded in each pixel and represented, for example, as a color or other graphical representation (such as shown in FIG. 4).

Figure 5:
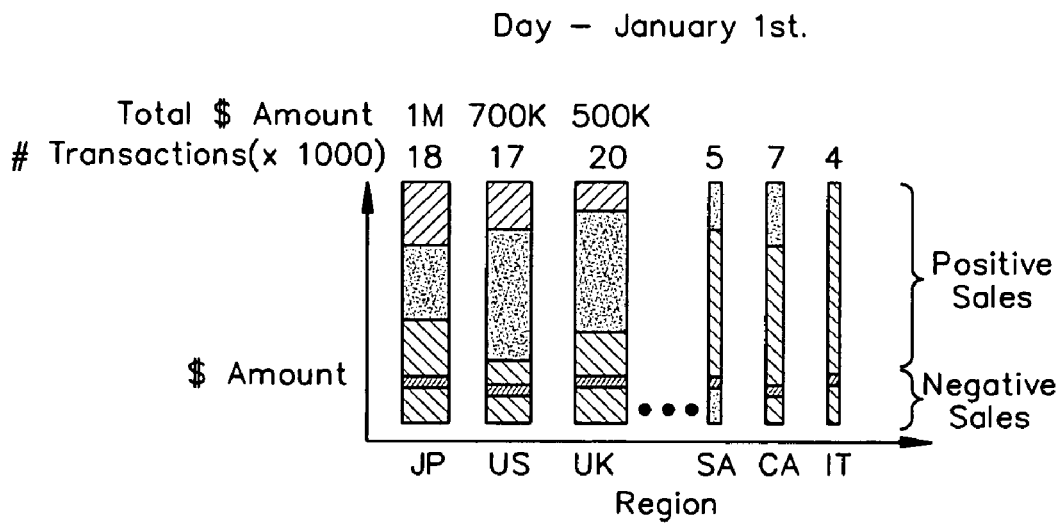
FIG. 5 is drilldown illustration of hierarchy level (3) of FIG. 2.

FIG. 5 is a drilldown illustration of hierarchy level (3) of FIG. 2. As the user performs this drilldown sequence, the graphical illustration in FIG. 5 is automatically generated or computed and then visually displayed to the user. For illustration purposes, the day of January $1^{st}$ is shown as a pixel bar chart. The illustration is generally similar to the illustration discussed in connection with FIG. 3. As one important difference, the X-axis in FIG. 5 represents various regions. For illustration purposes, the regions are designated as various countries or geographical regions, such as JP (Japan), US (United States), UK (United Kingdom), SA (South America), CA (Canada), IT (Italy), etc. The Y-axis represents a dollar amount ($ Amount).

Figure 7:
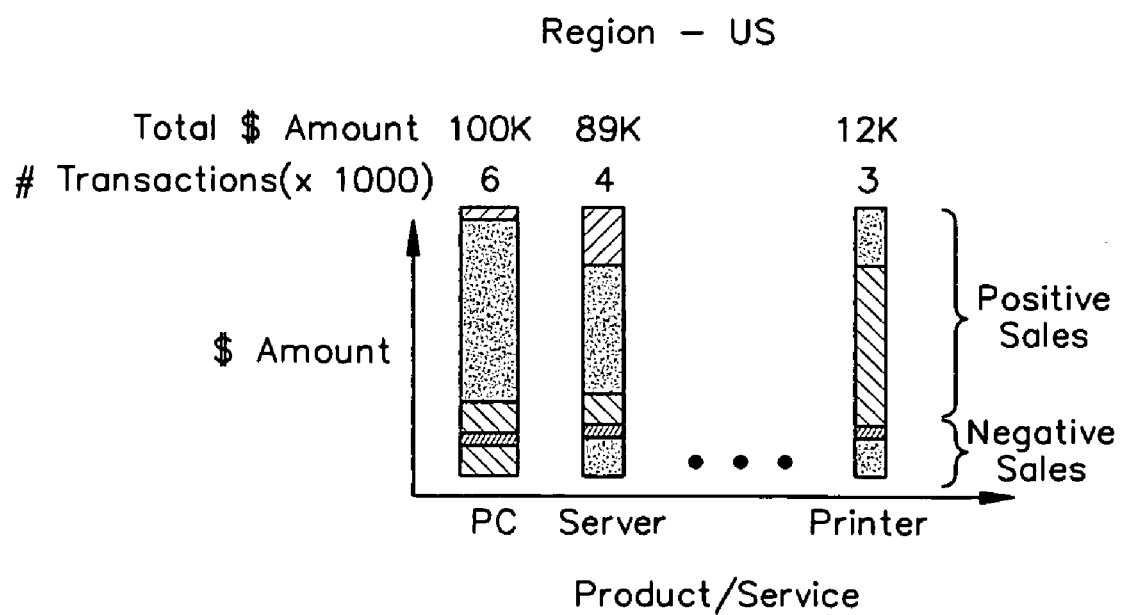
FIG. 7 is a drilldown illustration of hierarchy level (4) of FIG. 2.

It should be noted that color can be used to visually present information to the user. In FIGS. 3, 5, 7, or in other figures, color can be used to provide a visual comparison for aggregated data. For example, the numbers in the "Total $ Amount" line or in the "# Transactions" line could be colored. For example, a green number could visually signify that the particular number is above the average computed from the above, adjacent level in the hierarchical tree. A red number could visually signify that the particular number is below the average computed from the above, adjacent level in the hierarchical tree. A black number could visually signify that the particular number is equal to the average from the above, adjacent level in the hierarchical tree. Of course, other colors could be used as well.

As a simple illustration, the "1M" in the line "Total $ Amount" of FIG. 5 could be colored green. This color would signify that sales of 1 million dollars in Japan on January $1^{st}$ were above the average daily sales of Japan for the entire month of January. By contrast, if the "700K" in the line "Total $ Amount" were colored red, then the red color would visually signify that sales in the United States on January $1^{st}$ were below average.

Figure 6:
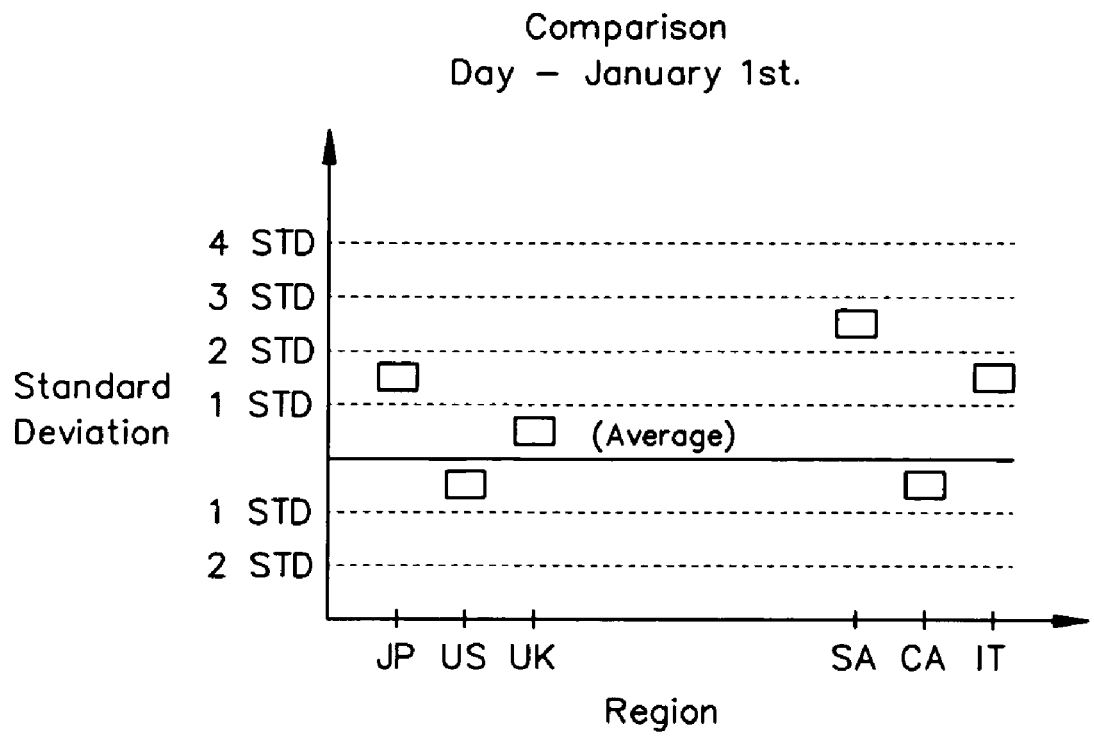
FIG. 6 is a comparative illustration for FIG. 5.

In an exemplary embodiment in accordance with the invention, single or numerous hierarchical levels can utilize a drilldown function to illustrate comparative or deviation type information. The type or extent of such comparative or deviation information is vast. For example, comparisons with an average value or deviations from a known or standard value can be shown. FIG. 6 shows one example.

FIG. 6 is a comparative illustration for FIG. 5. FIG. 6, for example, could be automatically generated or computed, upon actuation from the user, as a variation window or graphical illustration to illustrate a difference in comparison. In FIG. 6, the X-axis is divided into the plurality of regions illustrated in FIG. 5. For illustration purposes, these regions are shown as JP, US, UK, SA, CA, and IT. The Y-axis is divided into standard deviations from an average, shown as a horizontal line approximately along the middle of the Y-axis. The average, for example, could represent the average sales of all the regions for January $1^{st}$. Looking to the examples of FIG. 6, on January $1^{st}$, Japan had approximately 1½ standard deviations above the average. The United States was slightly below the average in sales on January 1st, and the United Kingdom was slightly above the average.

Modifications to the comparative illustration of FIG. 6 are quite numerous. For example, the average along the Y-axis could instead represent average daily sales for a month of all countries or a single country or region. Numerous variations are within exemplary embodiments of the invention. FIG. 6 illustrates that comparative or deviation type information can be visually portrayed for a particular level or for a particular chart or illustration.

FIG. 7 is a drilidown illustration of hierarchy level (4) of FIG. 2. As the user performs this drilldown sequence, the graphical illustration in FIG. 7 is automatically generated or computed and then visually displayed to the user. For illustration purposes, the United States is shown as a region. The illustration is generally similar to the illustration discussed in connection with FIG. 3. As one important difference, the X-axis in FIG. 7 represents various products and/or services. For illustration purposes, the products and/or services are designated as personal computer (PC), server, printer, etc. The Y-axis represents a dollar amount ($ Amount).

Figure 8:
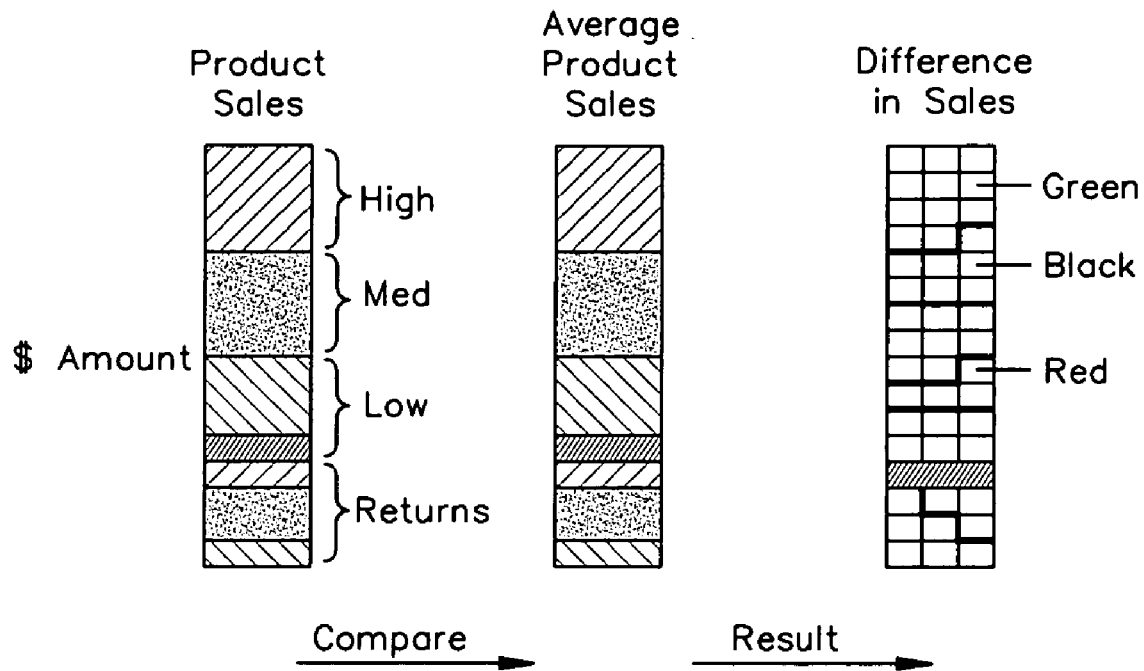
FIG. 8 is a comparative illustration for FIG. 7.

As noted, a comparison can be made of each bar's aggregated value, such as total value, with the average value from a previous level. For a data distribution, a resulting pixel difference bar can be generated. FIG. 8 illustrates one such example.

FIG. 8 illustrates an example of using visual comparison to present or analyze differences in data distribution at the record level. In this example, differences in data distribution are shown as product sales up/increase and product sales down/decrease. For this illustrative scenario, each product can be represented by a single pixel, with each pixel representing a single product sale at the record level. The X-axis is a day (for example January $1^{st}$), and the Y-axis is value or dollar amount ($ Amount). Pixels are arranged from bottom to top and from left to right in the Product Sales bar and Average Product Sales bar. The dollar amount of each product sales can be encoded in the pixel color or pixel graphical representation, for example. Thus, each product on January $1^{st}$ is compared with a corresponding product in the average product sales bar. In the resultant or comparison sales bar, color is used to show the difference in sales. As an example, green can be used to show product sales on January $1^{st}$ as being greater than the average sales for that product. Black can be used to show product sales on January $1^{st}$ with no change or unfound. Red can be used to show product sales on January $1^{st}$ as being less than the average sales for that product. From FIG. 8, the difference in sales (such as increase or decrease in sales) can be readily visualized at the record level. Further, it should be noted that data distribution paradigms can comprise over a million data records.

Figure 9:
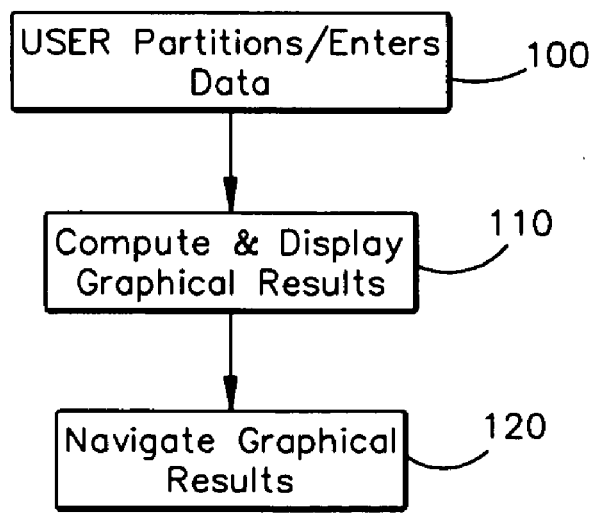
FIG. 9 is a flowchart illustrating a method in accordance with an exemplary embodiment of the present invention.

FIG. 9 illustrates a flowchart in accordance with an exemplary embodiment of the invention. Per block 100 a user partitions and/or enters data. A user, for example, could enter data to develop or define specific levels for construction of a user defined multi-level hierarchical structure, such as the structure shown and described in connection with FIGS. 1 and 2. Further, the user can enter data to define or build specific drilldown sequences, such as those described in connection with the various figures. Further yet, the user can enter data to define how to partition the data. For example, the user can define the various X-Y axes in FIGS. 3 and 5-7. For illustration purposes only, some user defined criteria would include, product categories, time (years, days, hours, minutes, etc.), geographical regions (cities, states, countries, etc.), and hierarchies. In short, the user can enter any or all of the parameters discussed in connection with FIGS. 1-8 to enable a user defined visual data comparative structure. Additional parameters are also within exemplary embodiments of the invention.

Per block 110, the graphical results are automatically computed as the user performs a drilldown sequence. Once the graphical results are computed, they are displayed to the user. The graphical results can be displayed in various formats, such as those discussed in connection with FIGS. 1-8. Preferably, as noted, each drilldown sequence automatically provides the user with a visual comparison with aggregated data from the previous, adjacent level. Thus, if a user drillsdown from level (N) to level (N+1), then the graphical illustration at level (N+1) will provide a visual comparison with data at level (N).

In one exemplary embodiment, all bars are automatically displayed in descending order (i.e., the group of concurrent bars with the highest values is placed at the left-most portion of the illustration, and the group of concurrent bars with the lowest values is placed at the right-most portion of the illustration). In short, the user preferably can quickly identify the top three and bottom three groups or bars.

Further, in one exemplary embodiment, value comparisons are made with data from the previous level in the multi-level hierarchical structure. Valuations can be colored or graphically illustrated for quick analysis. For example, green could represent high value (such as higher sales) while red represents low value (such as lower sales).

Per block 120, the user can navigate graphical results through a multitude of possible paths along the hierarchical tree shown in FIG. 1. The user could specifically choose a level from the multi-level hierarchical structure for a more detailed inspection or comparison. The user could thus drill-down, navigate up, down, and through the various levels to visualize both aggregated data and data distribution. Further, it should be noted that the display of such graphical results is not limited to the single illustrations. In other words, multiple illustrations can simultaneously be displayed to the user. For example, the graphical illustrations of FIGS. 5 and 6 can simultaneously be displayed to the user on a single display or on multiple displays.

The structure of the multi-level hierarchical tree can be used to compare various values or information (such as current ranking average, standard deviations, and data distribution) with average values from other levels (such as the average group value from the previous upper level or level (N−1)). For example, the user can visually compare the sales of a specific day to the average daily sales for the month in which the specific day occurs. For a data distribution, the resultant pixel difference bar can be generated. Further, visual comparison can be used to analyze differences in data distribution (such as increase and/or decrease in sales).

FIGS. 1-9 illustrate various aspects of the invention. As shown, a dynamic hierarchical tree structure can be developed based on user input. This input can include specific drilldown sequences to perform automatic comparisons with data at various levels of the hierarchical tree, such as comparison of level (N) with level (N−1). Visual comparisons can identify discrepancies or differences in various paradigms, such changes in aggregated data (such as comparisons with average values), and changes in how data is distributed. These changes, and corresponding comparisons, can be revealed with different visualization techniques or visual data comparison techniques. By way of example only, such visualization techniques include two dimensional and three dimensional illustrations, including bar charts, pie charts, X-Y charts, and other graphical or data representative techniques.

In another exemplary embodiment in accordance with the invention, data in the illustrations can be ordered to provide ranking or sequential information. For example in FIG. 5 or 7, the bars can be aligned in a specific order to portray visual information. In FIG. 5, regions with the top three sales can be provided first (here JP, US, and UK), and regions with the bottom three sales can be provided last (here SA, CA, and IT). In FIG. 7, products and/or services with the highest sales can be listed first, and products and/or services with the lowest sales can be listed last.

Further, a user can repeatedly drilldown throughout the multi-level hierarchical structure. A drilldown, for example, can occur to visually identify comparison results or deviations within the data. As such, exemplary embodiments of the present invention show not only visualizing changes in aggregation data, but also show visualizing the differences in data distribution while navigating or drilling-down through the data. It should be noted that the comparison techniques are not limited to pixel bar charts or any specific type of graphical representation. The comparison techniques can be utilized with various graphical tools, such as bar charts, pie charts, and/or parallel coordinates, to name a few examples.

As noted various graphical illustrative formats can be used with embodiments of the present invention. Pixel bar charts are one such format. In a pixel bar chart, data values can be directly presented instead of aggregated into several data values. Each data item is represented by a single pixel in the bar chart. The detailed information of a single attribute for each data item is encoded into the pixel (for example, into the pixel color). The data can then be displayed and accessed.

Pixel bar charts can be defined or specified with five tuples or attributes (such as pixel object, dividing attribute, Y-ordering attribute, X-ordering attribute, and coloring attribute). For example, FIG. 3 can be arranged as a pixel bar chart and have five tuples (arranged as customer, day, dollar amount, number of visits/transactions, dollar amount). The pixel bar chart of FIG. 3 can be constructed as follows: First, group the pixels into rectangles according to the grouping attribute (days) to divide the X-axis space. Second, fill the corresponding rectangles with pixels from the bottom and place the pixels in order inside each rectangle according to the pixel ordering attribute (dollar amount for Y-axis and number of visits/transactions for X-axis). Lastly, color or shade the pixels according to the pixel color or shade attribute (dollar amount, number of transactions, or other attribute).

Embodiments in accordance with the present invention can also utilize multi-pixel bar charts. Multi-pixel bar charts use different color mappings with the same partitioning and ordering attributes. In other words, different attributes are mapped to different colors. Preferably, each pixel (for example, each customer) is located at the same relative location across all pixel bar charts. At the same time though, each pixel shows a different attribute (such as number of transactions, quantities, locations, etc.). In turn, the color of each pixel varies according to the value of the corresponding attribute. The user can activate (such as "click-on") a pixel to get the corresponding attribute value.

Embodiments in accordance with the present invention can be utilized for visualization of multidimensional data sets using multiple pixel bar charts and other embodiments using pixel bar charts. As such, United States Publication No. 2003/0071815 A1 (Pub. Date: Apr. 17, 2003) and entitled "Method for Placement of Data for Visualization of Multidimensional Data Sets Using Multiple Pixel Bar Charts" is fully incorporated herein by reference. Further, embodiments in accordance with the present invention can be utilized for visual comparing or mining of multiple simultaneous presentations and other such presentations. As such, U.S. application Ser. No. 09/609,101 filed Jun. 30, 2000 and entitled "Method and Apparatus for Visual Mining of Multiple Simultaneous Presentations by Plugging in a Plurality of Existing Graphic Toolkits" is fully incorporated herein by reference.

The method and system in accordance with embodiments of the present invention may be utilized, for example, in hardware, software, or combination. The software implementation may be manifested as instructions, for example, encoded on a program storage medium that, when executed by a computer, perform some particular embodiment of the method and system in accordance with embodiments of the present invention. The program storage medium may be optical, such as an optical disk, or magnetic, such as a floppy disk, or other medium. The software implementation may also be manifested as a program computing device, such as a server programmed to perform some particular embodiment of the method and system in accordance with embodiments of the present invention.

While the invention has been disclosed with respect to a limited number of embodiments, those skilled in the art will appreciate, upon reading this disclosure, numerous modifications and variations. For example, various types of data can be utilized with embodiments in accordance with the present invention. Such data includes, but is not limited to, revenue analysis, fraud analysis, business impact analysis, e-commerce analysis, or other business data. It is intended that the appended claims cover such modifications and variations and fall within the scope of the invention.

What is claimed is:

1. A method for presenting data, comprising:
receiving the data; and
deriving a multi-level dynamic hierarchical structure for the data based on drilldown sequences input from a user, wherein the drilldown sequences automatically compute a graphical visual comparison of the data and comprise:
deriving a multi-pixel bar chaff that simultaneously displays numerical values of aggregated data for plural bars; and
deriving a graphical illustration that displays a comparison of the numerical values of aggregated data.

2. The method of claim 1 wherein the comparison includes standard deviations for the numerical values of aggregated data.

3. The method of claim 1 wherein the plural bars of the multi-pixel bar chart have equal heights.

4. The method of claim 1 wherein deriving a graphical illustration further comprises providing a comparison of product sales with average product sales to derive a difference in product sales.

5. The method of claim 1 wherein deriving a graphical illustration further comprises deriving standard deviations between a plurality of products.

6. The method of claim 1 wherein deriving a multi-level dynamic hierarchical structure further comprises inputting preferences from the user for a plurality of different levels of the multi-level hierarchical structure.

7. The method of claim 1 wherein deriving a multi-pixel bar chart further comprises ordering a plurality of bars according to product ranking.

8. The method of claim 7 wherein ordering a plurality of bars further comprises arranging three consecutive bars to have a highest ranking and arranging three consecutive bars to have a lowest ranking.

9. The method of claim 1 wherein deriving a multi-pixel bar chart further comprises coloring pixels green and coloring pixels red, wherein the green pixels represent higher sales than the red pixels.

10. A computer-readable medium having computer-readable program code embodied therein for causing a computer system to perform a method of arranging data, said method comprising:
determining a set of attributes for placement of the data in a pixel bar chaff having plural bars that each include a plurality of pixels with each pixel encoded with a portion of the data; and
drilling down from the pixel bar chart to derive (1) another pixel bar chart that displays numerical values of aggregated data for each of plural bars and (2) a graph that displays a comparison of the numerical values of aggregated data.

11. The computer-readable medium of claim 10 wherein said method further comprises constructing a multi-level hierarchical tree having a plurality of different levels to graphically illustrate at least a portion of the data.

12. The computer-readable medium of claim 10 wherein said graphically displayable array comprises an X-axis and a Y-axis.

13. The computer-readable medium of claim 12 wherein the X-axis represents a data category and the Y-axis represents a data value.

14. The computer-readable medium of claim 10 wherein each pixel is encoded with a color.

15. The computer-readable medium of claim 14 wherein the pixels are encoded with a plurality of different colors.

16. A computer system, comprising:
a bus;
a display device coupled to the bus;
a computer-readable memory coupled to the bus; and
a processor coupled to the bus, the processor executing code for:
receiving data;
deriving a multi-level dynamic hierarchical structure for the data based on preferences input from a user; and
navigating through the multi-level dynamic hierarchical structure using drilldown sequences input from the user, the drilldown sequences automatically computing (1) a pixel bar chart showing numerical values of aggregated data for each of plural bars and (2) a graph showing comparisons between the numerical values of aggregated data.

17. The computer system of claim 16 wherein the a pixel bar chart is based on attributes from a previous hierarchical level.

18. The computer system of claim 16 wherein the graph provides a chart with multiple colors to visually signify changes in data distribution at a record level.

19. The computer system of claim 16 wherein the graph comprises a comparison of a dollar amount of product sales during a first period of time with a dollar amount of an average product sales during a second period of time.

20. The computer system of claim 16 wherein the graph comprises over one million data records.

* * * * *

UNITED STATES PATENT AND TRADEMARK OFFICE
CERTIFICATE OF CORRECTION

PATENT NO. : 7,643,029 B2  Page 1 of 1
APPLICATION NO. : 10/774315
DATED : January 5, 2010
INVENTOR(S) : Ming C. Hao et al.

It is certified that error appears in the above-identified patent and that said Letters Patent is hereby corrected as shown below:

In column 9, line 8, in Claim 1, delete "chaff" and insert -- chart --, therefor.

In column 9, line 46, in Claim 10, delete "chaff" and insert -- chart --, therefor.

In column 10, line 36, in Claim 17, after "the" delete "a".

Signed and Sealed this

Twenty-seventh Day of April, 2010

David J. Kappos
*Director of the United States Patent and Trademark Office*